(12) United States Patent
Chang

(10) Patent No.: US 10,525,765 B2
(45) Date of Patent: Jan. 7, 2020

(54) COMBINATION STRUCTURE OF HUB AND SPOKES

(71) Applicant: GOOD (TAIWAN) INTELLIGENT CO., LTD., Taichung (TW)

(72) Inventor: Kuo-Ching Chang, Taichung (TW)

(73) Assignee: GOOD (TAIWAN) INTELLIGENT CO., LTD., Taichung (TW)

( * ) Notice: Subject to any disclaimer, the term of this patent is extended or adjusted under 35 U.S.C. 154(b) by 176 days.

(21) Appl. No.: 15/812,620

(22) Filed: Nov. 14, 2017

(65) Prior Publication Data
US 2018/0207977 A1 Jul. 26, 2018

(30) Foreign Application Priority Data
Jan. 24, 2017 (TW) .............................. 106102606 A

(51) Int. Cl.
*B60B 1/02* (2006.01)
*B60B 1/04* (2006.01)
*B60B 27/00* (2006.01)

(52) U.S. Cl.
CPC .......... *B60B 1/0223* (2013.01); *B60B 1/0246* (2013.01); *B60B 1/0261* (2013.01); *B60B 1/042* (2013.01); *B60B 27/0026* (2013.01)

(58) Field of Classification Search
CPC .............................. B62D 55/088; B62D 55/06
USPC ......................................................... 301/59
See application file for complete search history.

(56) References Cited

U.S. PATENT DOCUMENTS

| | | | | |
|---|---|---|---|---|
| 9,610,802 | B2 * | 4/2017 | Satterthwaite | B60B 27/023 |
| 2003/0090141 | A1 * | 5/2003 | Dietrich | B60B 1/0269 301/58 |
| 2004/0130204 | A1 * | 7/2004 | Schlanger | B60B 1/0276 301/59 |
| 2006/0145530 | A1 * | 7/2006 | Damon | B60B 1/041 301/110.5 |
| 2007/0138860 | A1 * | 6/2007 | Cappellotto | B60B 1/0246 301/104 |
| 2017/0136810 | A1 * | 5/2017 | Schlanger | B60B 1/0261 |

FOREIGN PATENT DOCUMENTS

| | | | |
|---|---|---|---|
| TW | I338632 B | | 3/2011 |
| TW | M435373 U | | 8/2012 |
| TW | M463202 U | * | 10/2013 |

* cited by examiner

*Primary Examiner* — S. Joseph Morano
*Assistant Examiner* — Jean W Charleston
(74) *Attorney, Agent, or Firm* — Muncy, Geissler, Olds & Lowe, PC

(57) ABSTRACT

A combination structure of a hub and spokes is provided, including: a hub shell, having separate small and large flanges, the small and large flanges having first and second assembling holes, respectively; a plurality of first spokes, assembled to one of the first assembling holes and a wheel rim; a plurality of second spokes, including cylindrical spokes and aero bladed spokes, the cylindrical spokes and aero bladed spokes being alternatively assembled to the second assembling holes and to the wheel rim; as viewed along an axial direction of the hub shell, every two of the second spokes which are neighboring to each other intersect with each other to define an intersecting area, each first spoke extends and passes through one of the intersecting areas.

4 Claims, 6 Drawing Sheets

COMBINATION STRUCTURE OF HUB AND SPOKES

BACKGROUND OF THE INVENTION

Field of the Invention

The present invention relates to a combination structure of a hub and spokes.

Description of the Prior Art

Usually, a center of a vehicle wheel is provided with a hub, and through a plurality of spokes which stretch and extend between a wheel rim of the vehicle wheel and two flanges of the hub, the vehicle wheel is driven with a balanced tension between left side and right side and a lateral rigidity.

In a conventional structure, regardless of the way of arrangement, each said hub has the spokes in the same type, for example, elbow spokes, straight spokes, cylindrical spokes or aero bladed spokes. This type of the structures are disclosed in TWM463202, TWM435373 and TWI338632.

However, this type of conventional structures did not take driving force, tension balance between left and right sides, and lateral rigidity into consideration, so the vehicle wheel does not have preferable driving force, tension balance between left and right sides, and lateral rigidity all at once, and usually one of the three factors is less preferable.

The present invention has arisen to mitigate and/or obviate the afore-described disadvantages.

SUMMARY OF THE INVENTION

The major object of the present invention is to provide a combination structure of a hub and spokes, which has preferable driving force, tension balance between left and right sides, and lateral rigidity.

To achieve the above and other objects, a combination structure of a hub and spokes is provided, including: a hub shell, having a small flange and a large flange which are spaced and radially protrude on an outer circumference thereof, the small flange having a plurality of first assembling holes therearound, the large flange having a plurality of second assembling holes therearound; a plurality of first spokes, two ends of each first spokes being respectively assembled to one of the first assembling holes and a wheel rim; a plurality of second spokes, including a plurality of cylindrical spokes and a plurality of aero bladed spokes, the plurality of cylindrical spokes and the plurality of aero bladed spokes being alternatively assembled to the plurality of second assembling holes and to the wheel rim; as viewed along an axial direction of the hub shell, every two of the plurality of second spokes which are neighboring to each other intersect with each other to define an intersecting area, and each of the plurality of first spokes extends and passes through one of the intersecting areas.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
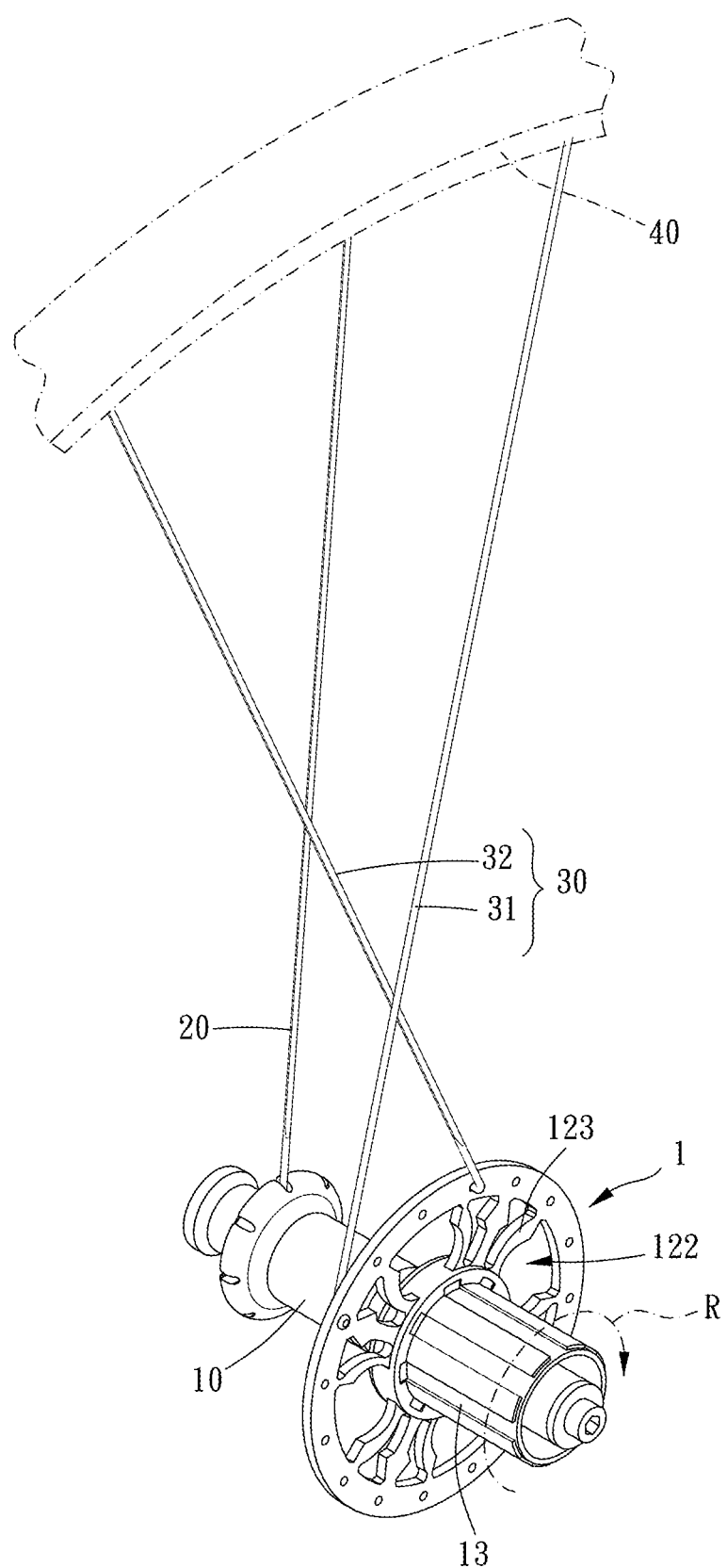
FIG. 1 is a stereogram of a preferred embodiment of the present invention.
Figure 2:
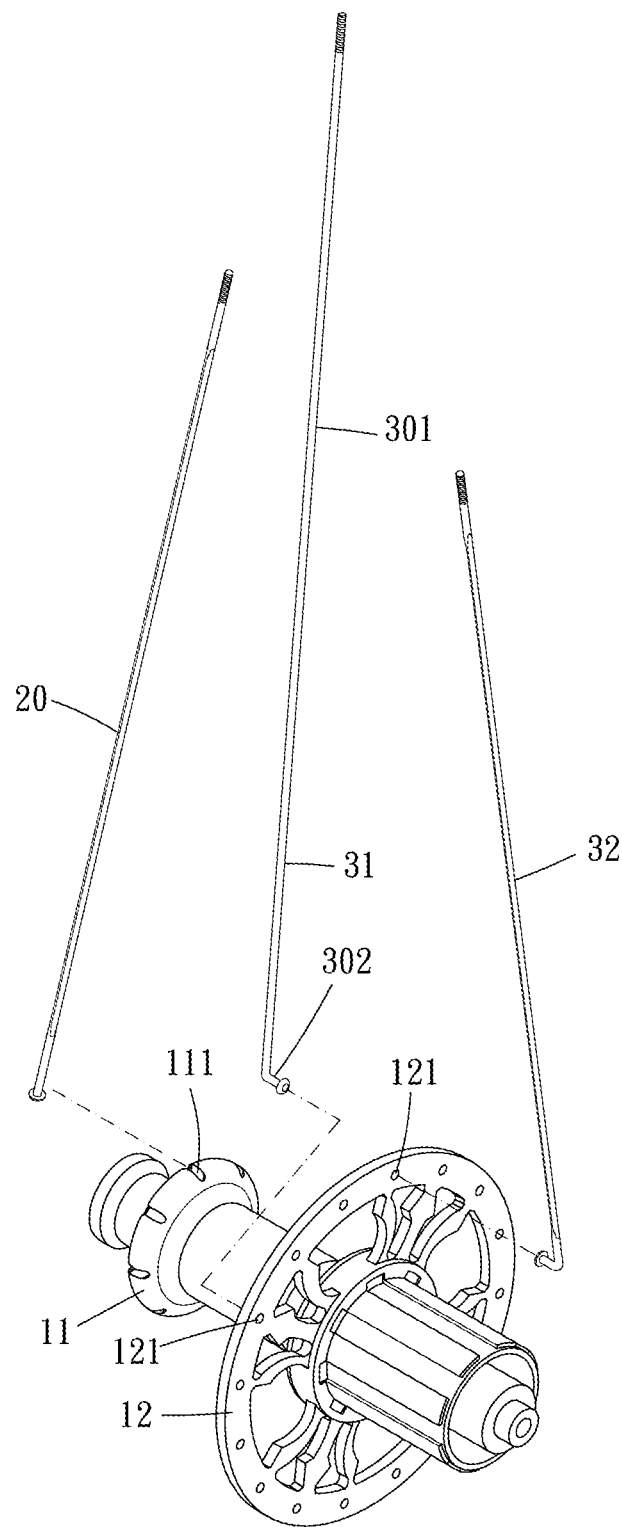
FIG. 2 is a breakdown view of the preferred embodiment of the present invention.
Figure 3:
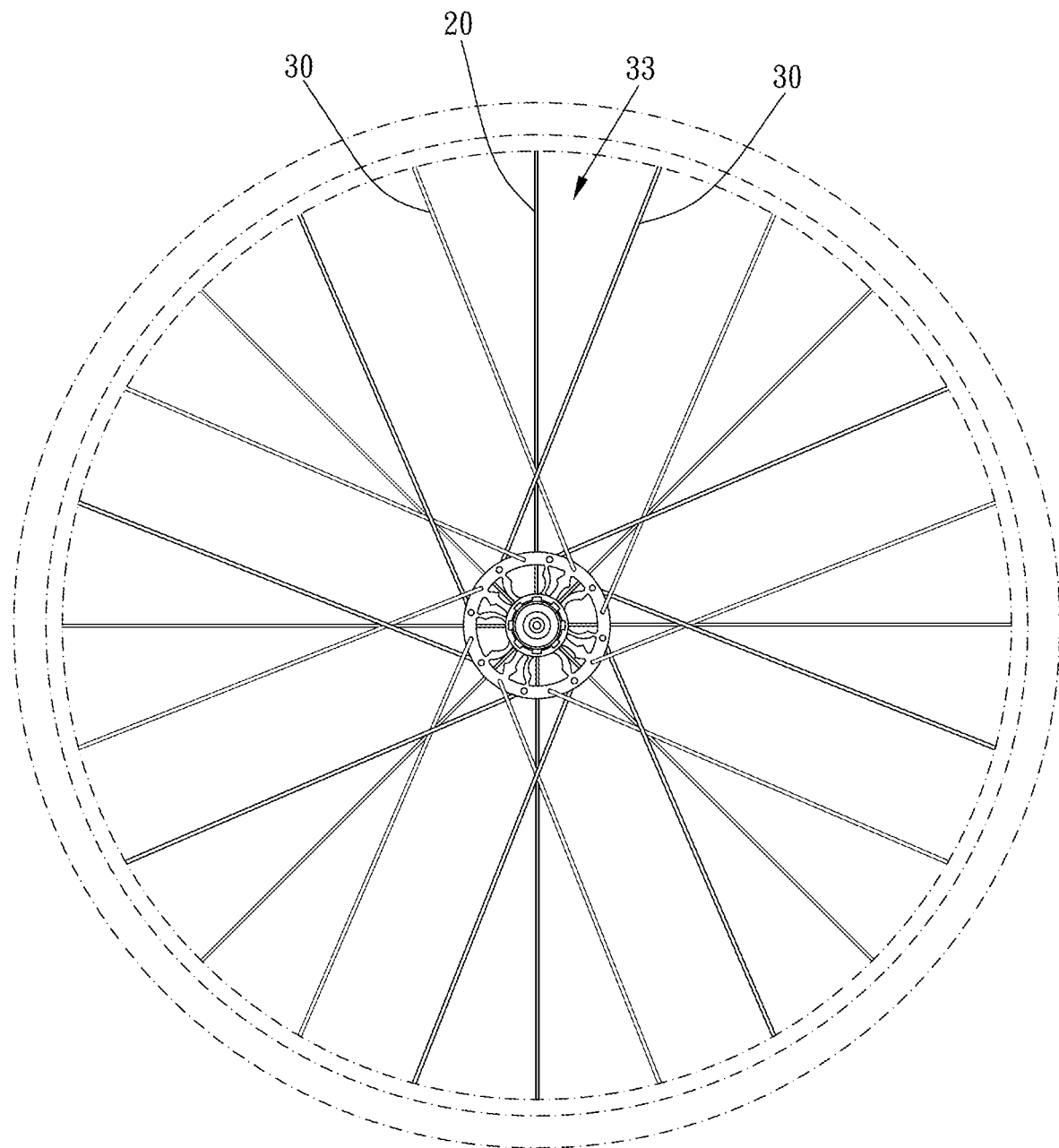
FIG. 3 is an axial side view of the preferred embodiment of the present invention.
Figure 4:
FIG. 4 is a radial side view of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 4 for a preferred embodiment of the present invention, a combination structure of a hub and spokes is provided, including a hub shell 10, a plurality of first spokes 20 and a plurality of second spokes 30. The hub shell 10 is made of aluminum alloy or other metals or alloys, and the plurality of first spokes 20 and the plurality of second spokes 30 are made of galvanized iron, carbon fiber or other metals or alloys.

The hub shell 10 has a small flange 11 and a large flange 12 which are spaced and radially protrude on an outer circumference thereof, the small flange 11 has a plurality of first assembling holes 111 therearound, and the large flange 12 has a plurality of second assembling holes 121 therearound. Two ends of each of the plurality of first spokes 20 are assembled respectively to one of the first assembling holes 111 and a wheel rim 40, in this embodiment, the first spoke 20 is a straight metal spoke, and one of the two ends of each said first spoke 20 is engaged into one of the first assembling holes 111 in disengageable tight-fit so as to decrease a free clearance between each said first spoke 20 and the first assembling hole 111 to increase a torsion rigidity. The plurality of second spokes 30 include a plurality of cylindrical spokes 31 and a plurality of aero bladed spokes 32, the plurality of cylindrical spokes 31 and the plurality of aero bladed spokes 32 are alternatively assembled to the plurality of second assembling holes 121 and to the wheel rim 40. As viewed along an axial direction of the hub shell 10, every two of the plurality of second spokes 30 which are neighboring to each other intersect with each other to define an intersecting area 33, and each of the plurality of first spokes 20 extends and passes through one of the intersecting areas 33. With the above-mentioned structure, a vehicle has preferable driving force, tension balance between left and right sides, and lateral (an axial direction of the hub) rigidity.

Figure 5:
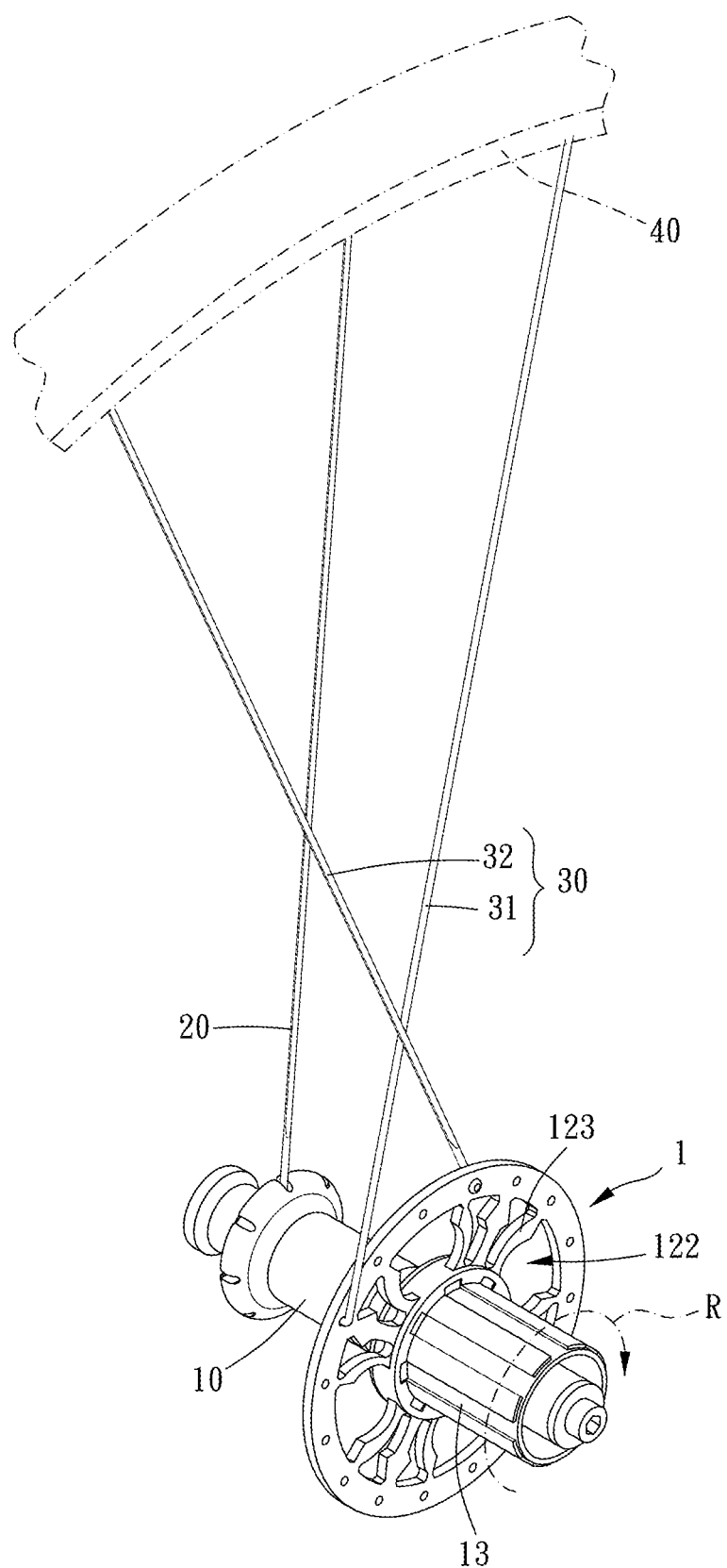
FIG. 5 is a stereogram of another preferred embodiment of the present invention.
Figure 6:
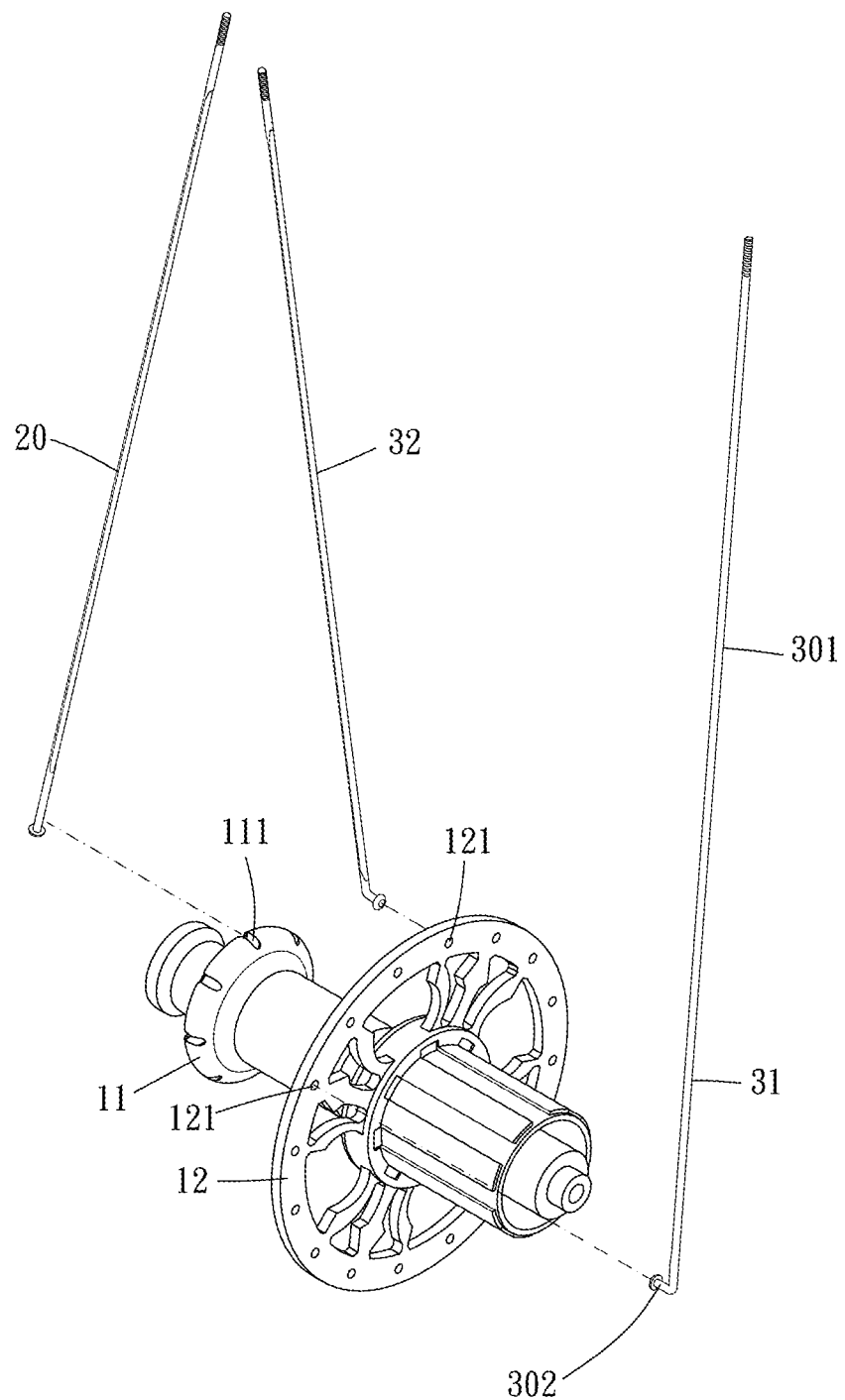
FIG. 6 is a breakdown view of another preferred embodiment of the present invention.

Specifically, the first assembling hole 111 is a lateral profile groove and radially opened on the small flange 11, and the second assembling hole 121 is an axial through hole. The first spoke 20 is an aero bladed and straight spoke, the second spoke 30 is an elbow spoke and includes a body section 301 which is for being assembled to the wheel rim 40 and a head end 302 which is curvedly connect to the body section 301, and the head end 302 is disposed through and engaged within the second assembling hole 121. The plurality of cylindrical spokes 31 and the plurality of aero bladed spokes 32 are located on two opposing sides of the large flange 12. In this embodiment, each said first spoke 20 extends and passes through an intersecting area 33 which is defined by two of the plurality of second spokes 30 neighboring to each other and equally separate the intersecting area 33 so as to balance the tension. The plurality of cylindrical spokes 31 extend from the inner side of the large flange 12, the plurality of aero bladed spokes 32 extend from the outer side of the large spoke 12, and each said cylindrical spoke 31 presses on an outer side of one said aero bladed spokes 32; but as shown in FIGS. 5 and 6, the plurality of cylindrical spokes 31 may extend from the outer side of the large spoke 12, the plurality of aero bladed spokes 32 may extend from the inner side of the large spoke 12, and each said aero bladed spoke 32 presses on the outer side of one said cylindrical spoke 31. The above-mentioned arrangements are great for driving force.

Specifically, the elbow spoke has preferable stability, the straight spoke has preferable driving force, the cylindrical spoke has preferable lateral rigidity, and the aero bladed spoke has preferable longitudinal rigidity, so the plurality of first spokes 20 which are flat and arranged on the small flange 11 and the aero bladed spoke 32 of the plurality of second spokes 30 which are flat and arranged on the large flange 12 are great for achieving tension balance between left and right sides of the wheel rim 40.

The hub shell 10 further includes a ratchet barrel 13 which axially extends from the large flange 12, the ratchet barrel 13 is for being driven by a sprocket component, relative to a rotation direction R of the ratchet barrel 13, each said cylindrical spoke 31 extends along the rotation direction (forward), and each said aero bladed spoke 32 extends along a direction counter to the rotation direction (backward). The rotation direction R is a direction along which the wheel rim 40 is driven to rotate, the plurality of aero bladed spokes 32 which have preferable longitudinal rigidity can elevate the driving capability, and the plurality of cylindrical spokes 31 can elevate the lateral rigidity.

Preferably, the large flange 12 further has a plurality of spoke-supporting structures 122 separately extending radially, each of the plurality of spoke-supporting structures 122 includes a plurality of rays 123 which are spacingly arranged and extend radially, and outermost two of the plurality of rays 123 of each said spoke-supporting structure 122 radially extend away from each other inside outside so that the large flange 12 is light and has preferable structural strength. A diameter ratio of the small flange 11 and the large flange 12 is 1:1.5 to 1:4.5, and preferably 1:3.0, and the diameter ratio can be adjusted according to different requirements so as to provide preferable tension balance between left side and right side and driving capability. The plurality of first spokes 20 define a first phantom annular face 21, the plurality of second spokes 30 define a second phantom annular face 34, as viewed along a radial direction of the hub shell 10, the first phantom annular face 21 and the second phantom annular face 34 have an included angle A therebetween, and the included angle A is 10 to 15 degrees which can be adjusted to help improve lateral component of force and rigidity.

With the arrangement of the plurality of first spokes 20 and the plurality of second spokes 30 and an adjustable diameter ratio of the small and large flanges 11, 12, the vehicle wheel can have preferable driving force, tension balance between left and right sides and lateral rigidity.

While we have shown and described various embodiments in accordance with the present invention, it should be clear to those skilled in the art that further embodiments may be made without departing from the scope of the present invention.

What is claimed is:

1. A combination structure of a hub and spokes, including:
   a hub shell, having a small flange and a large flange which are spaced and radially protrude on an outer circumference thereof, the small flange having a plurality of first assembling holes therearound, the large flange having a plurality of second assembling holes therearound;
   a plurality of first spokes, two ends of each of the plurality of first spokes being assembled respectively to one of the first assembling holes and a wheel rim;
   a plurality of second spokes, including a plurality of cylindrical spokes and a plurality of aero bladed spokes, the plurality of cylindrical spokes and the plurality of aero bladed spokes being alternatively assembled to the plurality of second assembling holes and to the wheel rim;
   wherein as viewed along an axial direction of the hub shell, every two of the plurality of second spokes which are neighboring to each other intersect with each other to define an intersecting area, and each of the plurality of first spokes extends and passes through one of the intersecting areas;
   wherein the first assembling hole is a lateral profile groove and radially opened on the small flange, and the second assembling hole is an axial through hole;
   wherein the first spoke is a straight spoke, the second spoke is an elbow spoke and includes a body section which is for being assembled to the wheel rim and a head end which is curvedly connect to the body section, and the head end is disposed through and engaged within the second assembling hole;
   wherein a diameter ratio of the small flange and the large flange is 1:1.5 to 1:4.5; the large flange further has a plurality of spoke-supporting structures separately extending radially, each of the plurality of spoke-supporting structures includes a plurality of rays which are spacingly arranged and extend radially, and outermost two of the plurality of rays of each said spoke-supporting structure radially extend away from each other inside outside; the first spoke is the aero bladed spoke; as viewed along the axial direction, each said first spoke extends and passes through an intersecting area which is defined by two of the plurality of second spokes neighboring to each other and equally separate the intersecting area; the plurality of first spokes define a first phantom annular face, the plurality of second spokes define a second phantom annular face, as viewed along a radial direction of the hub shell, the first phantom annular face and the second phantom annular face have an included angle therebetween, and the included angle is 10 to 15 degrees; the hub shell is made of aluminum alloy, and the plurality of second spokes are made of galvanized iron; the plurality of cylindrical spokes are located on an outer side of the large flange, and the plurality of aero bladed spokes are located on an inner side of the large flange.

2. The combination structure of a hub and spokes of claim 1, wherein the plurality of first spokes are made of galvanized iron or carbon fiber.

3. The combination structure of a hub and spokes of claim 1, wherein the plurality of cylindrical spokes and the plurality of aero bladed spokes are located on two opposing sides of the large flange.

4. The combination structure of a hub and spokes of claim 1, wherein the hub shell further includes a ratchet barrel which axially extends from the large flange, the ratchet barrel is for being driven by a sprocket component, relative to a rotation direction of the ratchet barrel, each said cylindrical spoke extends along the rotation direction, and each said aero bladed spoke extends along a direction counter to the rotation direction.

\* \* \* \* \*